(12) United States Patent
Albinson et al.

(10) Patent No.: US 8,880,043 B1
(45) Date of Patent: Nov. 4, 2014

(54) ABBREVIATED-DIALING CODE TELECOMMUNICATIONS WITH SOCIAL MEDIA INTEGRATION

(71) Applicants: Chris Albinson, Larkspur, CA (US); Joseph Gillespie, Mill Valley, CA (US); Timothy Jemison, Palo Alto, CA (US); Michael Caffey, Hayward, CA (US); Kevin Haight, Foster City, CA (US); Wey Pang, San Jose, CA (US); Michael Heveren, Sunnyvale, CA (US); Vinay Gupta, Fremont, CA (US); Matthew Roderick, San Jose, CA (US); Song Guo, San Jose, CA (US)

(72) Inventors: Chris Albinson, Larkspur, CA (US); Joseph Gillespie, Mill Valley, CA (US); Timothy Jemison, Palo Alto, CA (US); Michael Caffey, Hayward, CA (US); Kevin Haight, Foster City, CA (US); Wey Pang, San Jose, CA (US); Michael Heveren, Sunnyvale, CA (US); Vinay Gupta, Fremont, CA (US); Matthew Roderick, San Jose, CA (US); Song Guo, San Jose, CA (US)

(73) Assignee: Zoove Corp., Palo Alto, CA (US)

( * ) Notice: Subject to any disclaimer, the term of this patent is extended or adjusted under 35 U.S.C. 154(b) by 2 days.

(21) Appl. No.: 13/942,157

(22) Filed: Jul. 15, 2013

Related U.S. Application Data

(60) Provisional application No. 61/811,519, filed on Apr. 12, 2013.

(51) Int. Cl.
*H04L 29/06* (2006.01)

(52) U.S. Cl.
USPC .................. 455/414.3; 455/414.1; 455/414.2

(58) Field of Classification Search
CPC ....... H04W 4/00; H04W 4/001; H04W 4/003; H04W 4/08; H04W 4/18
USPC .................................. 455/414.1, 414.2, 414.3
See application file for complete search history.

(56) References Cited

U.S. PATENT DOCUMENTS

| | | | |
|---|---|---|---|
| 6,522,876 B1 | 2/2003 | Weiland et al. | |
| 6,990,472 B2 | 1/2006 | Rosenhaft et al. | |
| 7,689,706 B2 | 3/2010 | Jennings | |
| 7,783,729 B1 | 8/2010 | Macaluso | |
| 7,813,716 B2 | 10/2010 | Malackowski et al. | |
| 7,865,181 B1 | 1/2011 | Macaluso | |
| 7,865,182 B2 | 1/2011 | Macaluso | |
| 7,865,447 B2 | 1/2011 | Rosenhaft et al. | |
| 8,015,307 B2 | 9/2011 | Jennings | |
| 8,041,341 B1 | 10/2011 | Malackowski et al. | |
| 8,073,784 B2 | 12/2011 | Rosenhaft et al. | |
| 8,170,541 B2 | 5/2012 | Macaluso | |
| 8,296,241 B2 | 10/2012 | Rosenhaft et al. | |
| 8,320,532 B1 | 11/2012 | Robbins | |
| 8,396,764 B1 | 3/2013 | Macaluso | |
| 8,457,619 B2 | 6/2013 | Macaluso | |
| 2008/0232572 A1 | 9/2008 | Macaluso | |
| 2011/0070877 A1 | 3/2011 | Macaluso | |
| 2011/0246287 A1* | 10/2011 | Wright et al. | 705/14.45 |
| 2011/0274260 A1* | 11/2011 | Vaananen | 379/93.23 |
| 2011/0276883 A1* | 11/2011 | Cabble et al. | 715/727 |
| 2012/0131013 A1* | 5/2012 | Hobbs et al. | 707/748 |
| 2012/0201362 A1* | 8/2012 | Crossan et al. | 379/88.01 |
| 2012/0209902 A1* | 8/2012 | Outerbridge | 709/201 |
| 2012/0284649 A1* | 11/2012 | Levy | 715/753 |
| 2013/0051539 A1* | 2/2013 | Sharp | 379/88.17 |
| 2013/0080918 A1* | 3/2013 | Bouzid et al. | 715/753 |
| 2013/0117254 A1* | 5/2013 | Manuel-Devadoss et al. | 707/709 |

* cited by examiner

*Primary Examiner* — Mazda Sabouri
(74) *Attorney, Agent, or Firm* — Bingham McCutchen LLP

(57) ABSTRACT

Abbreviated-dialing codes are used to facilitate access to and information exchanged with social-media websites. Based on the code and/or other information contained in the call, a post may be made to, or information obtained from, a social-media website.

18 Claims, 4 Drawing Sheets

ABBREVIATED-DIALING CODE TELECOMMUNICATIONS WITH SOCIAL MEDIA INTEGRATION

CROSS-REFERENCE TO RELATED APPLICATIONS

This application claims priority to and the benefit of U.S. Provisional Patent Application Ser. No. 61/811,519, filed on Apr. 12, 2013, which is hereby incorporated herein by reference in its entirety.

TECHNICAL FIELD

Embodiments of the present invention relate to systems and methods for providing and processing telephone calls made using abbreviated-dialing codes and, more particularly, to integrating information received during the call with social media.

BACKGROUND

Social-media web sites, such as FACEBOOK, TWITTER, GOOGLE PLUS, and others, are widely used and increasing in popularity. Many users upload status updates, information, news, breaking events, and other similar content to these social-media sites using, for example, SMS text messages, emails, smartphone applications, or web browsers. All of these input methods, however, require typing (often on a small and inconvenient smartphone keyboard) and an often-metered data connection. A user, especially a mobile user, may not always have access to a 3G/4G data connection on his or her smartphone and may not have SMS text messaging included on his or her mobile account (or may subscribe to a pay-per-text type account). A need therefore exists for a system and method that enables users to post content to social-media sites with greater flexibility and ease.

SUMMARY

In various embodiments, the present invention includes systems and methods for linking telecommunications systems that support abbreviated-code dialing with social media (i.e., technology and communication tools, which are typically Internet-based, that permit participants or members to disseminate, discuss, share, or acquire information to or from a group of individuals with whom the party has indicated an interest). A user may initiate a telephone call from a cellular or other telephone that includes an abbreviated-dialing code ("ADC") and additional information related to social-media content, commands, recipients, Web sites, or other information; the systems and methods of the present invention receive the ADC and information and post, share, or otherwise process the information in accordance with the user's communicated intent and/or information stored about the user. The user's information may be provided orally (for transcription into a text posting) or otherwise. In this way, the user easily reaches, interacts with and posts information on the social-media site.

An ADC may begin with one or more non-alphanumeric characters, such as pound ("#") or star ("*"), followed by one or more alphanumeric characters, such as 0-9 or A-Z. A user dials the code from a mobile device to initiate a call; a mobile-switching center server (or similar system) is programmed to recognize at least the non-numeric prefix of the code and forward the code to an ADC platform, which parses the code and performs an action determined by the code and/or other information communicated in the call. For example, the code may be associated with a product or service, and the ADC platform may forward information related to the product or service to the mobile device. The present invention may further include, without limitation, receiving an ADC and other information from the user, analyzing the ADC and received information, and posting, to one or more social-media platforms, content related to the ADC and/or other received information. The steps and examples in accordance with various embodiments of the present invention are described further below in more detail.

In one aspect, a method of posting social media content via a wireless telecommunication device includes receiving, at a server from a caller, an incoming call comprising an abbreviated dialing code; parsing, at the server, the abbreviated dialing code to determine an identity of a social media service designated in the abbreviated dialing code; retrieving, by the server from a database, a caller record including log-on information of the caller facilitating access to the designated social media service in the caller's name; capturing, at the server, speech of the caller spoken in response to a prompt; converting, at the server, at least a portion of the captured speech into text; and causing at least a portion of the text to be posted to the designated social media service as if by the caller, the posted text conforming to a format of the social media service.

The format may include a limitation on a number of text characters in a post. The converting step may include recognizing at least one control character spoken by the caller and including the at least one control character in the posted text. The control character may be a hashtag ("#"), and the converting step may further include recognizing a word spoken by the caller after the control character, and (iii) the text posted to the social media service comprises the word tagged with the hashtag. The converting step may include recognizing at least one command spoken by the caller, and wherein the text is posted to the social media service in accordance with the command. The converting step may include recognizing at least one command spoken by the caller by querying the social media service in accordance with the command and transmitting information back to the caller in accordance with information received from the social media service in response to the query. The command may include a request for trending information on the social media service. The parsing step may determine the identities of a plurality of social media services, and the text may be posted to each of the plurality of social media services. The text posted to the social media may include information representing a location of the caller.

In another aspect, a system for posting social media content via a wireless telecommunication device includes a database including caller records including log-on information of callers for facilitating access to social media services in the callers' names and access information and format requirements for at least one social media service; a service platform for sending and receiving data over a network; and a processor configured for (i) receiving, from a caller via the service platform, an incoming call comprising an abbreviated dialing code; (i) parsing the abbreviated dialing code to determine an identity of a social media service designated in the abbreviated dialing code; (ii) retrieving, from the database, a caller record associated with the caller; (iii) capturing speech of the caller spoken in response to a prompt; (iv) converting at least a portion of the captured speech into text; and (v) communicating, via the service platform, with the designated social media service to cause at least a portion of the text to be posted to the designated social media service as if by the caller, the posted text conforming to a format requirement of the designated social media service specified in the database.

The format may include a limitation on a number of text characters in a post. The processor may be configured to recognize at least one control character spoken by the caller and to include the at least one control character in the posted text. The control character may be a hashtag ("#"), and the processor may be further configured to recognize a word spoken by the caller after the control character and to include the word tagged with the hashtag in the text posted to the social media service. The processor may be further configured to recognize at least one command spoken by the caller, the text being posted to the social media service in accordance with the command. The processor may be further configured to recognize at least one command spoken by the caller; query the social media service via the service platform in accordance with the command; and transmit information back to the caller via the service platform in accordance with information received from the social media service in response to the query. The command may include a request for trending information on the social media service. The processor may be configured to parse the identities of a plurality of social media services and to cause posting of the text, via the communication platform, to each of the plurality of social media services. The portion of the text posted to the social media may include information representing a location of the caller.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
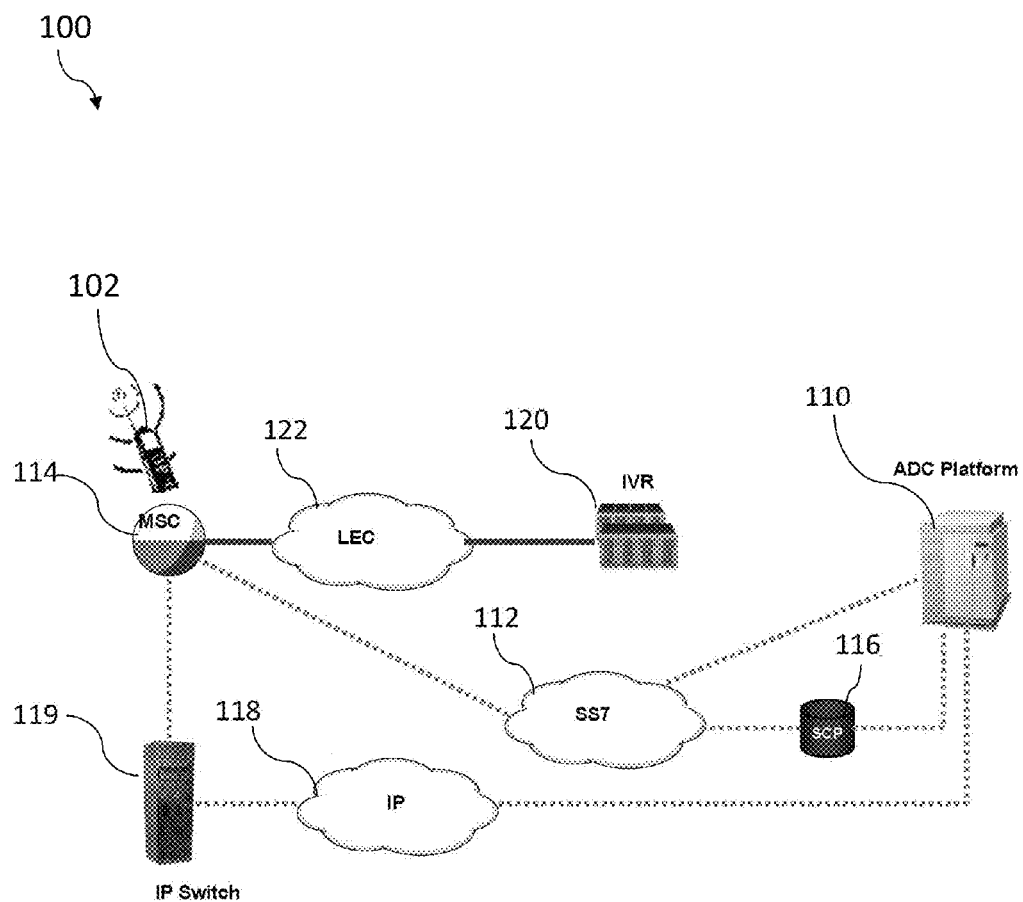
FIG. 1 illustrates a network environment including an ADC platform in accordance with various embodiments of the present invention.

FIG. 1 illustrates a cellular and Internet network environment 100 that includes an ADC platform 110. The ADC platform 110 receives a call that includes an ADC from a phone (such as a cellular phone 102). The call may be received via any number of different systems, such as a mobile-switching center 114, simple-message-service centers, multimedia-message-service centers, wireless-application-protocol gateways, or push-proxy gateways; the ADC may be sent using any number of different signaling protocols, such as SIP, MM7, ANSI-41, CAMEL, or PAP. The call may be transported via a service-control point 116 (belonging to and maintained by, for example, a cellular-service provider); in another embodiment, the ADC platform includes some or all of the functionality of the service-control point 116 and receives the ADC directly from an SS7 network 112 (or other network). The ADC may also be received via a TCP/IP or other network connection via, for example, an API.

A response (such as an SMS text or email) may be sent back to the mobile phone 102 via SS7 112 signaling, an IP link 118 (with an IP switch 119), or any other network. The ADC platform 110 may also or in addition instruct the mobile-switching center (MSC) 114 to connect the user to an interactive-voice-response 120 system, via, e.g., a local exchange carrier 122, to play a recorded message or an audible tone on the mobile device. These responses may include a text or audio message to the caller informing him or her of successful submission of the ADC and associated content to the ADC platform 110 and/or include any other information related to the ADC.

Other information may be sent to the ADC platform 110 along with the code, such as the phone number of the mobile device, the manufacturer of the mobile device, the operating system running on the mobile device, and/or the location of the mobile device. As explained in greater detail below, this other information may also include social-media content and/or instructions. The ADC platform 110 may also be connected, via an Internet or other network link, to databases of further information or other systems, such as caller-identification information and social-media sites or APIs.

Figure 2:
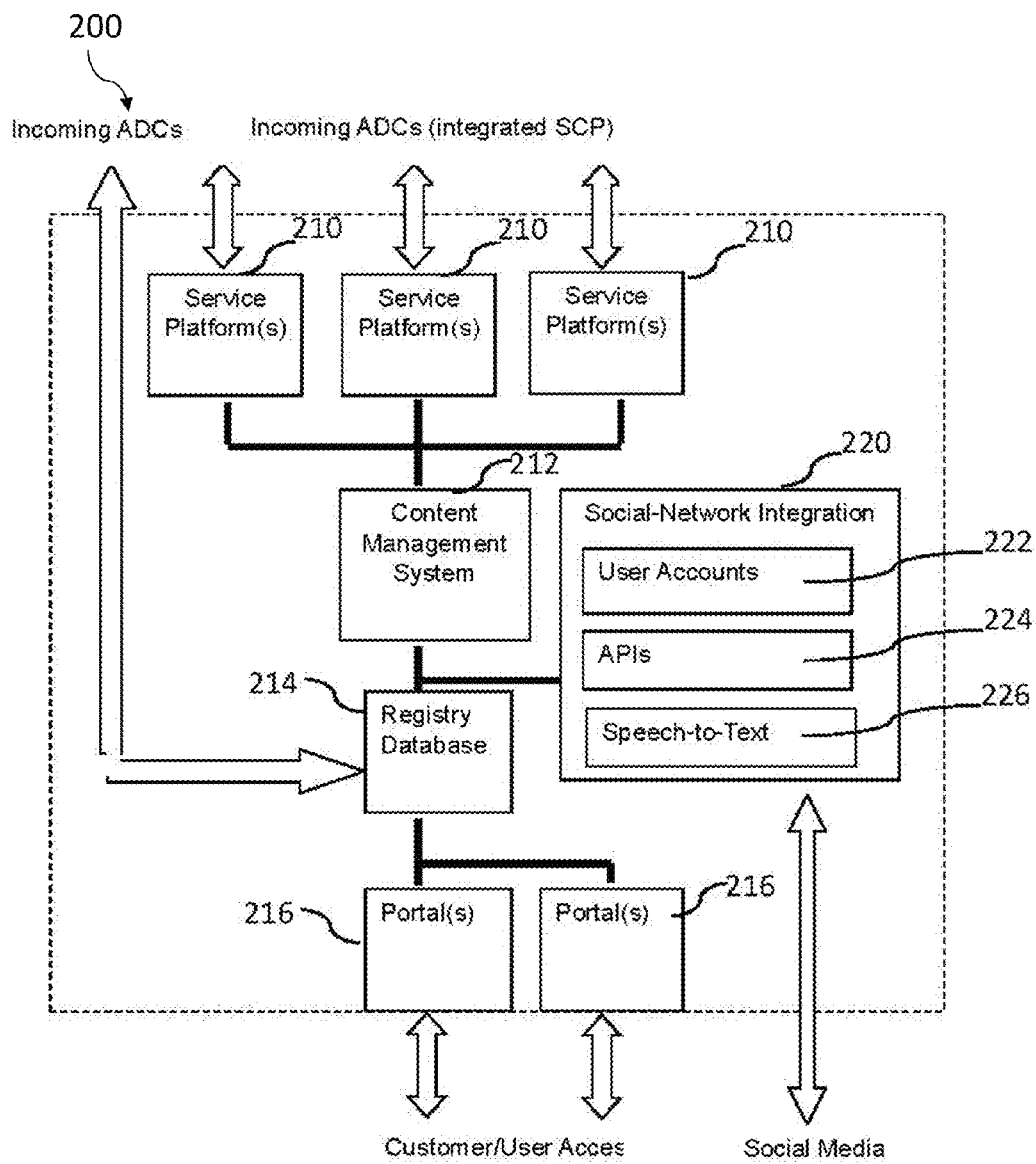
FIG. 2 illustrates an exemplary social-network ADC platform in accordance with various embodiments of the present invention.

An exemplary ADC platform 200 is shown in greater detail in FIG. 2. One or more conventional service platforms 210 contain communication circuitry enabling them to handle incoming and outgoing call processing for the ADC platform 200; to cellular carriers, for example, the service platforms 210 may appear like service-control points 116. The service platforms 210 may also communicate via IP networks (using, e.g., SMSC, MMSC, or WAP PPG) with cellular carriers or other entities; in this case, the service platform 210 may appear to third-party systems as a content aggregator. As used herein, the term "network" broadly connotes any computer or telecommunication system facilitating communication among network-connected nodes such as computers, telephones, mobile devices, etc.; a network (such as the Internet) may be local or involve widely dispersed switches and routers that are themselves organized into networks (e.g., local networks or subnetworks) on a smaller scale.

More or fewer service platforms 210 may be deployed by the ADC platform 200 as capacity needs change (e.g., more or fewer calls are received). The service platforms 210 may also perform content delivery for the ADC platform 200; they may deliver, for example, SMS content and/or multimedia content and may also push URLs (or other links/pointers to content) to end-user devices. The content delivered by the service platforms 210 may either be physically hosted on the ADC platform 200 or may be sent to the service platform 210 by a third party via an API.

The ADC platform 200 may also include a content-management system 212, which may include or communicate with a database of call-processing instructions, data, content, or other information related to call processing. The content-management system 212 may contain only information that is needed for real-time call processing and may be responsible for pushing this real-time information out to some or all of the service platforms 210 used in the ADC platform 200. In addition, the content-management system 212 may receive call detail records back from some or all of the service platforms 210 as calls are being processed.

A registry database 214 may contain an ADC registry for storing metadata or other information related to fulfillment of call requests. For example, the registry database 214 may include or communicate with a data warehouse that stores for a period of time (e.g., one year) records of the transactions that have been processed by the ADC platform 200; this data may be accessed via a portal 216, as discussed below. The registry database 214 may not be used for real-time call processing; it may include, for example, only business logic and rules and leave the call processing to the content-management system 212. Any data in the registry database 214 required by the content-management system 212 may be copied/mirrored thereto (using, for example, synchronization software). In this embodiment, therefore, components for real-time call processing (e.g., the service platforms 210) are separated from components for non-real-time processing (e.g., the registry database 214); the present invention is not limited, however, to only this configuration, and systems having wholly or partially integrated real-time and non-real-time components are within the scope of the present invention.

The system may include one or more portals 216, i.e., user interfaces (which may be provided as interactive web pages or otherwise) for operating and monitoring the ADC platform 200 (e.g., registry aspects and/or the campaign-management aspects of the ADC system). In addition, the portals 216 may provide reporting and analytic information related to the processed calls. A management portal, for example, may be used to register for an account and set up a campaign; a carrier-management portal may be used to view details of ADCs that have been approved; and a customer-service portal may be used to provide support information.

A social-network interaction module 220 may be used to integrate ADC dialing and service capabilities with social media. The module may include information about user accounts 222 (e.g., which incoming phone numbers are linked to which social media accounts), APIs 224 to send data to or receive data from social-media sites or applications, and a speech-to-text function 226. The module 220 is illustrated as a separate unit, but one of skill in the art will understand that the module may be wholly or partially integrated into other components, such as the registry database 214 and/or the content-management system 212.

Figure 3:
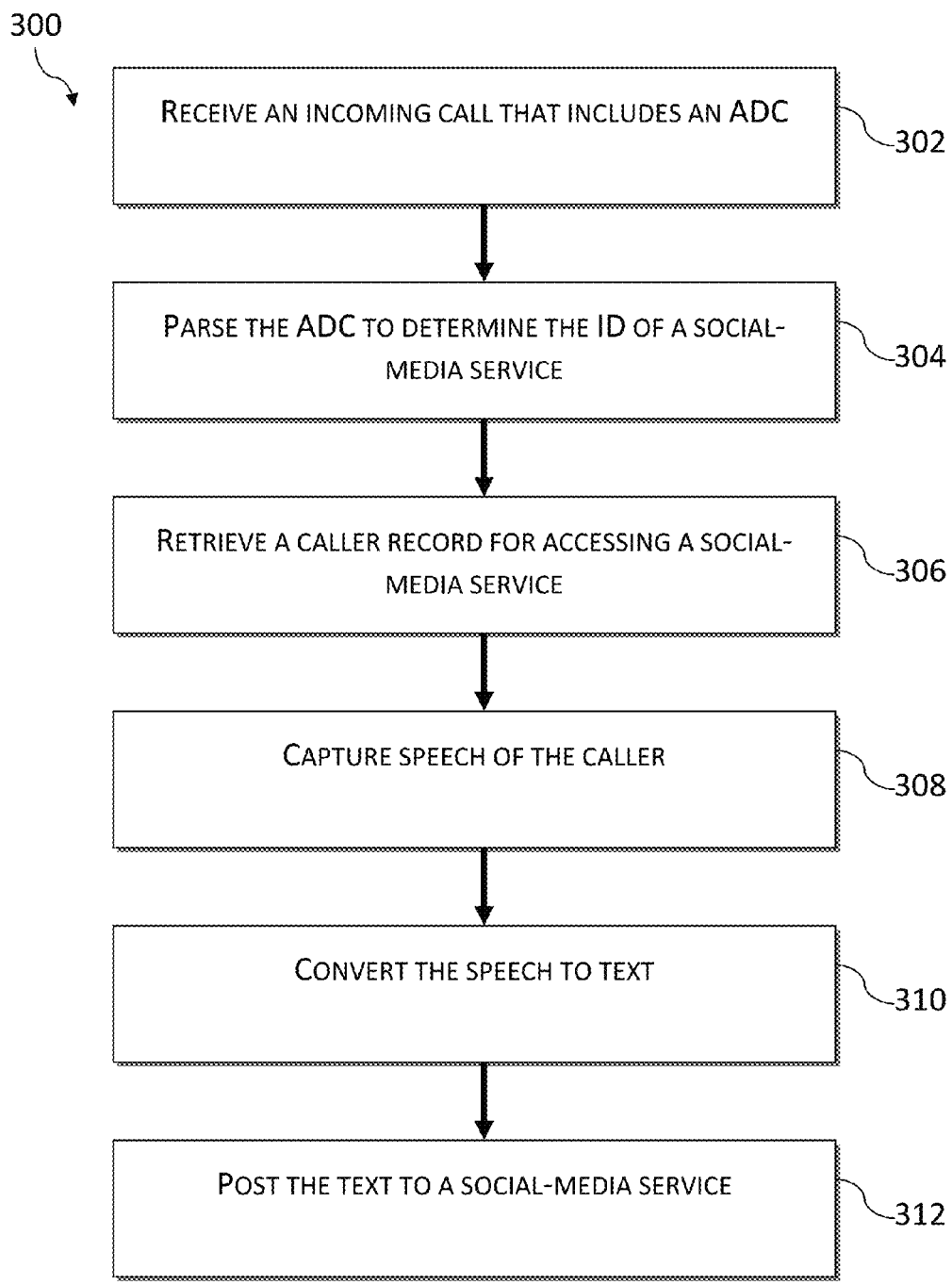
FIG. 3 illustrates a method for performing social-media functions based on received ADCs in accordance with various embodiments of the present invention.

A representative method 300 for posting social-media content via a wireless communication device (e.g., a cellular phone) appears in FIG. 3. In a first step 302, an incoming call dialed by a user of a cellular phone is received at a server (e.g., the ADC platform 200) as described above. The call contains an ADC; the identity of a particular social-media service (or services) is obtained by parsing the ADC (and/or other information received in the call) in a second step 304. In a third step 306, a caller record (e.g., information related to the caller) is retrieved from a database of caller/user information; the caller record may include, for example, username and password information related to a social-media website of which the caller is a user or subscriber. In a fourth step 308, the server captures speech of the caller (in one embodiment, after the server prompts the caller to speak) and, in a fifth step 310, converts the speech to text. In a sixth step 312, server posts the text to the social-media website in a manner or format conforming to the particular social-media service.

Referring again to step 304, in greater detail, different ADCs may be used to distinguish between various social-media sites or services; in one embodiment, a single ADC may be used to identify multiple sites. Examples of social-media sites or applications to which content may be posted include FACEBOOK, TWITTER, FOURSQUARE, GOOGLE PLUS, or any other similar site. The ADC may include the full names of these sites, abbreviated names of the sites, or keywords or numbers representing the sites. For example, the ADC "**FB" may indicate that a post is to be made to FACEBOOK. The ADC platform 200 parses the received ADC (using any method or system of parsing strings known in the art) to identify any social-media sites contained therein. In one embodiment, the ADC platform analyzes the ADC to determine a user's intended social-media site if no exact matches are found (if, e.g., there are misspellings in the ADC).

With reference again to step 306, the ADC platform 200 determines the identity of a social media account associated with the mobile device by examining the ADC and, in some embodiments, other information received at the ADC platform 200 (such as the telephone number of the calling phone). In various embodiments, the user of the phone sets up an account on the ADC platform 200 specifying the social-media account and associated log-in information; the user's account information is stored in a database (e.g., the registry database 214) maintained by or accessible to the ADC platform 200. In these embodiments, the ADC platform obtains the log-in information by querying the database with information received in the call (e.g., the user's phone number). The user account on the ADC platform may further include user preferences related to content filtering, posting style, signatures, or other such preferences. The user may access the ADC platform 200 via, for example, a portal 216 to set up or edit their account via an Internet or other connections.

In other embodiments, the ADC platform 200 determines the identity of the social-media account by querying a third-party database associated with the indicated social-media service. For example, the ADC platform 200 may query a TWITTER database of user-account information (via, for example, an API) with a user's telephone number; the TWITTER database may respond with the user's log-in information and/or a channel for communicating with the ADC platform 200.

With reference again to step 308, the phone captures a segment of audio with its microphone and transmits the audio over the phone connection to the ADC platform 200. The ADC platform 200 records the audio as a digital file (e.g., an MP3 or WAV file) and stores it in a local database (e.g., the registry database 214) and/or transmits it for storage in a different or third-party database. In some embodiments, the ADC platform 200 truncates the audio so that its temporal length does not exceed a fixed number of seconds.

The user may be presented with audio feedback to assist in the recording of the audio from the phone. For example, upon sending the ADC, the user may receive an audio prompt, such as a chime or other sound and/or a voice recording such as "speak your message now" or "say your message after the tone." The recording of the audio may terminate when the user ends the call or presses a key (e.g., "#"); a further audio prompt may inform the user which key to press to end the recording. The audio may include the user's voice, the voice of others, or any other ambient sound within range of the phone's microphone. In one embodiment, the recording of the audio automatically terminates once the recording has reached a maximum duration of time (e.g., one minute).

With reference to the fifth and sixth steps 310, 312, in one embodiment, the ADC platform 200 performs a speech-to-text function 226 on the audio and transmits the text transcript of the audio to a specified social-media site. The truncation function mentioned above may further operate on the text transcript in a manner responsive to the destination; for example, in the case of TWITTER, the ADC platform 200 may limit the text transcript to 140 characters or a fraction thereof. The ADC platform 200 may transmit a message to the mobile phone (as discussed above) informing the user of the phone of the transmission of the file and/or link. In one embodiment, the ADC platform 200 analyzes the received audio for the presence of known audio samples, such as samples from television, movies, radio, songs, or other such sources. If the ADC platform 200 detects a match, it may transmit a message to the mobile phone with information derived therefrom, such as the name of the movie, television show, or song detected and/or promotional or other information associated with the detected source.

The ADC platform 200 may analyze the audio to detect keywords or command words therein and, in accordance with the functions and/or features provided by the destination social-media site, perform further actions. For example, a user may speak the keyword "tag" or "hashtag," followed by another word or words, and the ADC may instruct a social-media site that supports tagging (e.g., TWITTER) to tag the post of the original ADC and/or audio and/or link with the words following the spoken keyword "tag." Other command keywords may include "public" or "private" (for specifying the intended audience of a post). In one embodiment, the ADC recognizes a word as a keyword based on its temporal position in the audio; if the keyword does not appear in the last quarter of the audio, for example, the ADC takes no action regarding the keyword. The alphanumeric characters in the ADC may include a word indicative of the nature of the social-media integration, such as #VOICE, *POST, or **SHARE; the present invention is not limited to any particular code. In one embodiment, the ADC platform 200 may prompt the user for entry of command keywords after the audio of the post content has ended. Information facilitating command processing or message formatting may be contained in the database 214 or other database. Once the social-media site(s) of interest have been identified, for example, site-specific commands, formatting requirements, policies, etc. may be retrieved and used to format and post the message.

In another embodiment, a user of a mobile phone receives recent or real-time information about social media by dialing an ADC. For example, a user receives information about trending topics (i.e., news items, people, or events undergoing an increase in popularity on social-media sites) by dialing, for example, "#TREND." The ADC system receives the ADC, interprets the request, queries one or more social-media sites (via, e.g., an API), and sends the retrieved trending topics back to the mobile phone. The geographical area to be searched for trending topics may be world-wide, within the country of the mobile phone, or within the state/city of the mobile phone. The ADC may determine the location of the mobile phone via, for example, information received from the cellular carrier transmitting the call or from the phone's GPS and/or Wi-Fi antennas. Similarly, the user may dial #TOPIC to receive information back on the topic specified in the ADC or #OFFERS to receive information back on offers (e.g., products or services on sale) near the user's location.

In another embodiment, the ADC platform 200 monitors social-media sources or sites (such as TWITTER, FACE-BOOK, or any other source or site) via HTTP, RSS, APIs, specific feeds from the sites, or any other interface for popular or trending topics, keywords, subjects, news items, celebrity names, events, or any other subject. The popular/trending subjects may be identified by their frequency of appearance in social-media posts and/or by identifying emphasized or marked words or phrases in the posts (e.g., hashtagged words in TWITTER). The social-network integration module 220 may then convert these identified popular/trending subjects (and/or related subjects) into ADCs so that, when a user dials an ADC containing all or part of a popular/trending subject, the ADC platform 200 delivers content to the user (via the methods described above) related to the topic. For example, the ADC platform 200 may determine that posts related to a currently popular sports playoff game are trending (i.e., increasing in popularity); the social-network integration module 220 may then create ADCs such as #TEAMNAME, #SPORTNAME, and/or #PLAYERNAME and deliver content related to the game when it recognizes incoming ADCs containing all or part of the created ADCs. If a received ADC matches more than one trending subject, the ADC platform 200 may return information related to the most popular subject, information related to all or some matching subjects, and/or a summary of the matching subjects (e.g., a list of matching TWITTER hashtags). The content returned to the user may include one or more posts related to the trending subject (e.g., one or more of the most popular, most shared, or most commented posts) or content provided by a third party.

In one embodiment, a user "checks in" (e.g., posts a message to a social media account informing others of the user's location) by dialing an ADC (e.g., *CHECKIN). The user may access the ADC system (via, e.g., a portal) to define one or more messages and keywords associated with those messages; the user may then post the messages to one or more social-media sites by including the keywords in a dialed ADC (e.g., "*TWITTER-KEYWORD1" posts the message associated with KEYWORD1 to TWITTER).

Dialed ADCs not directly related to social-media sites may also be used to create posts on social-media sites associated with a user's account. For example, an ADC campaign may include advertisements to dial **NFL to receive information regarding football scores; if a user dials this ADC and has specified a social-media account with the ADC platform 110, the platform may post a message (to, e.g., the user's TWITTER account) related to the delivery of the information (e.g., "Just received the latest scores!").

In one embodiment, a user of a mobile phone may dial an ADC and send a segment of audio to the ADC platform 200 as a note or a reminder. The ADC platform 200 parses the audio, converts it to text, and stores the audio and/or text on the ADC system 200 for later access by the user (via, for example, a portal 216). In various embodiments, the ADC platform 200 may send messages to the user related to the stored audio and/or text based on keywords therein by, for example, querying a third-party database (for example, a GOOGLE search). The messages may include links to relevant websites related to the keywords. For example, if the keywords include travel information, airline flights, or similar requests, the ADC platform 200 may send links to airline or weather-related web sites and/or flight-status information.

Information related to a user's social-media accounts (and/or user information stored on the ADC platform 200) may be used to customize responses sent to the user to, for example, provide information more relevant to the user. The user's location, age, sex, profession, or other such information may be obtained from the user's account information, and topics or keywords of interest may be determined from the user's previous social-media posts or links. In one embodiment, the ADC platform 200 maintains a history or "profile" associated with ADCs dialed from a given telephone number, regardless of whether the number is associated with an social-media account (though that information may be included as well). This profile may include information related to the ADCs dialed, the location of dialing, the associated social-media account, information sent or received from the associated social-media account, received audio samples, or any other such information. The saved profile information may be used to customize future responses and/or to provide "rewards" (e.g., offers, coupons, or the like) for frequent ADC dialers.

In some embodiments, the ADC platform 200 analyzes the voice content for keywords (i.e., time, location, keyword, product, service, flight status, pharmacy, etc.) and sends information related to the keywords to the user device. In other embodiments, the ADC platform compiles the user and/or keyword information into a database (e.g., the registry database 214); users or groups of users may thus have "profiles" of behavior compiled related to their dialed ADCs or posted content. These user profiles may be used to predict the user's future interest or behavior; this prediction may be used in customizing future messages sent to the user by the ADC platform 200 and/or be sold to third-party advertisers. In other embodiments, the ADC platform detects users posting similar content (i.e., having similar detected keywords) and may communicate these similarities to the user(s) or social-media sites (which may, for example, send connection/"friend" requests to the user(s).

The ADC platform 200 may support the purchase of goods and/or services through a user account maintained with a social-media site. In these embodiments, a user dials an ADC associated with a request for a good or service, and authorizes (or has previously authorized) payment to be made via a designated social-media site; the ADC platform 200 causes payment for the good or service to be provided using financial information obtained from the user's social-media accounts. For example, the user may have a credit on FACEBOOK; if the user dials **PIZZA, the funds in the user's FACEBOOK account are used to purchase the pizza. In this case, the ADC platform 200 will typically maintain information regarding the user, social media accounts and permissions in a user database. It should be stressed, however, that the ADC platform 200 need not maintain any sensitive financial information of the user, since this is maintained at the social-media site or on a secure payment-processing server. The ADC platform 200 may also be configured to require authentication or other security measure before accepting the instruction to pay via the social media account. In still other embodiments, the ADC platform 200 causes the user's phone to connect to the social-media site so that the user can authorize payment directly through the site.

In one embodiment, a software application running on a user's smartphone (e.g., an IPHONE or ANDROID phone) allows a user to type in a message and select a destination; when the user presses "post" (or performs an equivalent function), the application causes the message to be converted to an ADC and transmitted to the ADC system, which reconstructs the message from the transmitted ADC and posts the message to the social-media site specified by the destination. In another embodiment, ADC dialing is integrated with other applications, such as social-media applications, running on a user's phone or computing device. For example, an application that provides "social dialing" (i.e., the initiation of a phone call triggered by clicking on or otherwise selecting a social-media contact or "friend") may include an option for dialing an ADC. In this example, the dialing of the ADC may trigger the sending of a message or other information to an indicated social-media friend. The message may include, for example, a tweet or post that includes notification of, or information related to, the dialing of the ADC.

In various embodiments, a rule-driver database, together with a triggered action database, are saved in the user's registry database 214. The rules in the rule-driver database may specify the different handling of incoming or outgoing calls or other messages based on information in the user's network of social-media contacts. For example, when the user calls or is called by someone using an ADC, the ADC platform 110 may determine whether the called party is a FACEBOOK friend or LINKEDIN contact and process the call differently depending on the answer. If a call to the user comes from a FACEBOOK friend, for example, a rule selected by the user (and associated with the user's database record) may cause the ADC to route the call to the user, whereas if the caller is not a FACEBOOK friend, other criteria (e.g., caller location, time of day, etc.) may be applied to determine (a) whether to route the call to the user's cellphone or to a different phone, and (b) whether to cause FACEBOOK to invite the caller to become a FACEBOOK friend or cause LINKEDIN to send a LINKEDIN invitation.

In some embodiments, different rules associated with different triggered actions may be deployed depending on the status of the called user and the caller. In one embodiment, the rules and triggered actions related to the status of the called user may include, without limitation, sending to voicemail if the called user is driving; sending to voicemail if the called user is at work; further analyzing based on caller's identity if the call is made during the working hour; and/or rejecting call if it is late at night (e.g., after 9 pm). In another embodiment, the rules and triggered actions related to the status of the caller may include, without limitation, determining identity of the caller; locating the caller (geographically); temporally locating the call (day and time); prompting a reminder associated with the caller (e.g., meeting, birthday, commencement, doctor appointment, etc.); referencing triggered actions from past behaviors associated with the same caller through the database; and/or displaying list of suggested actions.

A user need not have an account associated with the ADC platform 200 in order to access social-media sites. For example, the ADC platform 200 may recognize a particular key combination (e.g., beginning with "#") as a request for a certain type of action on a social-media site, and in response, the ADC platform 200 may return a link to the relevant internal webpage of the social-media site; although the user may be required to log in to the site in order to access the page, he or she need not navigate to it from the social-media site's homepage. More generally, a prefix such as "#" may be used to inform the response provided to the user by the ADC platform 200, and may be combined, for example, with geolocation or other relevant user information in order to particularize the response. In one embodiment, an alphanumeric character commonly used in social media but not present on an ordinary telephone keypad (e.g., "@") may be automatically (or after user confirmation) used to replace another telephone-keypad character (e.g., "*").

Figure 4:
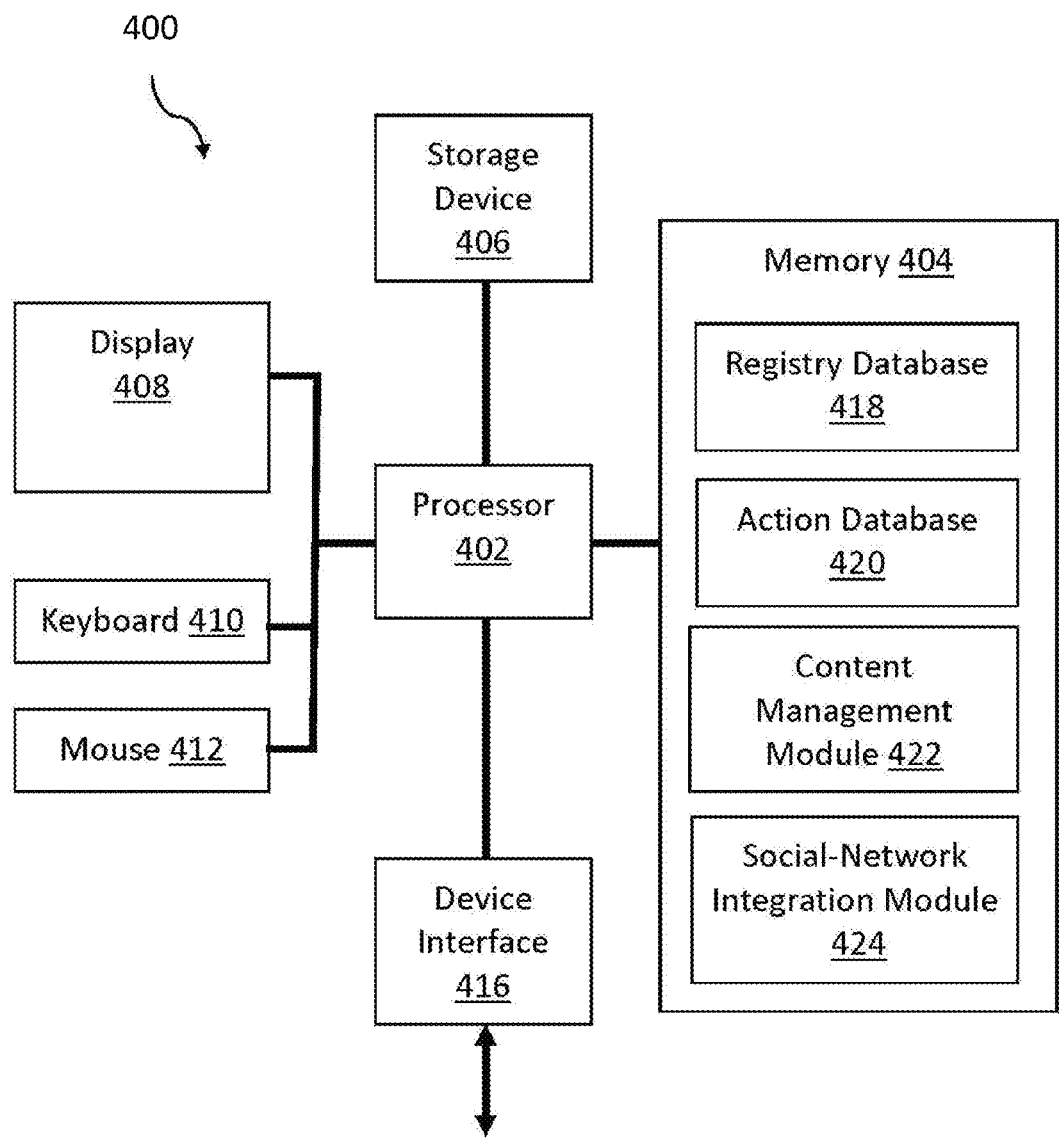
FIG. 4 illustrates an exemplary social-media ADC computing system in accordance with various embodiments of the present invention.

An exemplary ADC system for implementing embodiments of the invention appears in greater detail in FIG. 4. The ADC system 400 may generally be any device or combination of devices capable of processing call and other data using techniques described herein. It should also be noted that embodiments of the present invention may be provided as one or more computer-readable programs or processors embodied on or in one or more articles of manufacture. The ADC platform 400 may be a computer that includes a processor 402 with one or more central processing units (CPUs), volatile and/or non-volatile main memory 404 (e.g., floppy disk, a hard disk, a CD ROM, a CD-RW, a CD-R, a DVD ROM, a DVD-RW, a DVD-R, a flash memory card, a PROM, a RAM, a ROM, or a magnetic tape), one or more mass storage devices 406 (e.g., hard disks, or removable media such as CDs, DVDs, USB flash drives, etc. and associated media drivers), a display device 408 (e.g., a liquid crystal display (LCD) monitor), user input devices such as keyboard 410 and mouse 412, and one or more buses (e.g., a single system bus shared between all components, or separate memory and peripheral buses) that facilitate communication between these components. An interface 416 may be used to connect the system 400 to other devices, networks, and users; it may include, for example, communication and interface circuitry for bidirectional communication over telecommunications and computer networks, such as Ethernet, Wi-Fi, or fiber-optic network circuitry. The main memory 404 may be used to store databases, including a registry database 418 and an action database 420, and modules including a content-management analyze module 422 and a social-network integration module 424. These modules generally include an operating system (e.g., a Microsoft WINDOWS, Linux, or APPLE OS X operating system) that directs the execution of low-level, basic system functions (such as memory allocation, file management, and the operation of mass storage devices), as well as higher-level software applications implementing the systems and methods described herein. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

The ADC system 400 is an illustrative example; variations and modifications are within the scope of the present invention (such as various server systems, desktop systems, laptop systems, tablets, smart phones or personal digital assistants, and so on). A particular implementation may include other functionality not described herein, e.g., wired and/or wireless network interfaces, media playing and/or recording capability, etc. Further, while ADC system 400 is described herein with reference to particular blocks, this implementation is not intended to limit the invention to a particular physical arrangement of distinct component parts. Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of posting social media content via a wireless telecommunication device, the method comprising the steps of:

receiving, at a server from a caller, an incoming telephone call comprising an abbreviated dialing code;

at the server, using the abbreviated dialing code to determine (i) an identity of a social media service comprised in the abbreviated dialing code and (ii) a command keyword comprised in the abbreviated dialing code for use with the social media service;

retrieving, by the server from a database, a caller record including log-on information of the caller facilitating access to the designated social media service in the caller's name;

capturing, at the server, speech of the caller spoken in response to a prompt;

converting, at the server, at least a portion of the captured speech into text;

causing at least a portion of the text to be posted to the designated social media service as if by the caller and as if the caller entered the command keyword to the social media service, the posted text conforming to a format of the social media service.

2. The method of claim 1, wherein the format comprises a limitation on a number of text characters in a post.

3. The method of claim 1, wherein the converting step comprises recognizing at least one control character spoken by the caller and including the at least one control character in the posted text.

4. The method of claim 3, wherein (i) the control character is a hashtag ("#"), (ii) the converting step further comprises recognizing a word spoken by the caller after the control character, and (iii) the text posted to the social media service comprises the word tagged with the hashtag.

5. The method of claim 1, wherein the converting step comprises recognizing at least one command spoken by the caller, and wherein the text is posted to the social media service in accordance with the command.

6. The method of claim 1, wherein the converting step comprises recognizing at least one command spoken by the caller, further comprising:

querying the social media service in accordance with the command; and transmitting information back to the caller in accordance with information received from the social media service in response to the query.

7. The method of claim 6, wherein the command comprises a request for trending information on the social media service.

8. The method of claim 1, wherein (i) the step of using the abbreviated dialing code determines the identities of a plurality of social media services, and (ii) the text is posted to each of the plurality of social media services.

9. The method of claim 1, wherein the text posted to the social media comprises information representing a location of the caller.

10. A system for posting social media content via a wireless telecommunication device, the system comprising:

a database comprising (i) caller records including log-on information of callers for facilitating access to social media services in the callers' names and (ii) access information and format requirements for at least one social media service;

a service platform for sending and receiving data over a network;

a processor configured for:

(i) receiving, from a caller via the service platform, an incoming telephone call comprising an abbreviated dialing code;

(ii) using the abbreviated dialing code to determine an identity of a social media service comprised in the abbreviated dialing code and a command keyword comprised in the abbreviated dialing code for use with the social media service;

(iii) retrieving, from the database, a caller record associated with the caller;

(iv) capturing speech of the caller spoken in response to a prompt;

(v) converting at least a portion of the captured speech into text; and (vi) communicating, via the service platform, with the designated social media service to cause at least a portion of the text to be posted to the designated social media service as if by the caller and as if the caller entered the command keyword to the social media service, the posted text conforming to a format requirement of the designated social media service specified in the database.

11. The system of claim 10, wherein the format comprises a limitation on a number of text characters in a post.

12. The system of claim 10, wherein the processor is configured to recognize at least one control character spoken by the caller and to include the at least one control character in the posted text.

13. The system of claim 12, wherein the control character is a hashtag ("#"), the processor being further configured to recognize a word spoken by the caller after the control character and to include the word tagged with the hashtag in the text posted to the social media service.

14. The system of claim 10, wherein the processor is further configured to recognize at least one command spoken by the caller, the text being posted to the social media service in accordance with the command.

15. The system of claim 10, wherein the processor is further configured to:

recognize at least one command spoken by the caller;

query the social media service via the service platform in accordance with the command; and transmit information back to the caller via the service platform in accordance with information received from the social media service in response to the query.

16. The system of claim 15, wherein the command comprises a request for trending information on the social media service.

17. The system of claim 10, wherein the processor is configured to parse the identities of a plurality of social media services and to cause posting of the text, via the communication platform, to each of the plurality of social media services.

18. The system of claim 10, wherein the portion of the text posted to the social media comprises information representing a location of the caller.

* * * * *